ކ
United States Patent [19]

Milton et al.

[11] Patent Number: 5,605,073
[45] Date of Patent: Feb. 25, 1997

[54] MOTOR VEHICLE STEERING COLUMN

[75] Inventors: Thomas J. Milton, Bay City; William D. Cymbal, Freeland; Kevin C. Ross, Hemlock, all of Mich.

[73] Assignee: General Motors Corporation, Detroit, Mich.

[21] Appl. No.: 521,763

[22] Filed: Aug. 31, 1995

[51] Int. Cl.⁶ ..................................................... B62D 1/19
[52] U.S. Cl. .......................... 74/492; 248/548; 248/900; 280/777; 280/779; 403/367
[58] Field of Search ..................... 74/492, 493; 248/548, 248/900; 280/777, 779, 780; 403/367

[56] References Cited

U.S. PATENT DOCUMENTS

| | | | |
|---|---|---|---|
| 3,792,626 | 2/1974 | Durkee et al. | 74/492 |
| 3,813,960 | 6/1974 | Windett et al. | 74/492 |
| 3,827,710 | 8/1974 | Connell et al. | 280/87 R |
| 4,241,937 | 12/1980 | Eggen et al. | 74/492 X |
| 4,452,096 | 6/1984 | Workman | 74/492 |

*Primary Examiner*—Allan D. Herrmann
*Attorney, Agent, or Firm*—Saul Schwartz

[57] ABSTRACT

A motor vehicle steering column including a longitudinally collapsible mast jacket, a lower mount whereat the mast jacket is supported for vertical pivotal movement, and an upper mount consisting of a pair of stationary rigid strikers and a pair of releasable capsules on the mast jacket each of which receives in plug-in fashion and automatically retains a corresponding one of the strikers. Each of the capsules includes a socket, a plunger bore intersecting the socket, a plunger in the plunger bore, and a plunger spring biasing the plunger toward an extended position partially obstructing the socket. Each striker has a cam at a distal end thereof and an inverted frustoconical body. When the mast jacket is pivoted vertically up, the cams on the strikers shift the plungers inward in the plunger bores. When the strikers are seated in the sockets, each plunger spring wedges the corresponding plunger between the frustoconical body of the striker and a side of the plunger bore converging with the frustoconical body of the striker. In a preferred embodiment, one of the plungers is oriented laterally and one is oriented longitudinally to eliminate lateral and longitudinal lash between the mast jacket and the vehicle body and the lower mount includes a flex plate which biases the mast jacket vertically downward to eliminate vertical lash between the mast jacket and the vehicle body.

5 Claims, 2 Drawing Sheets

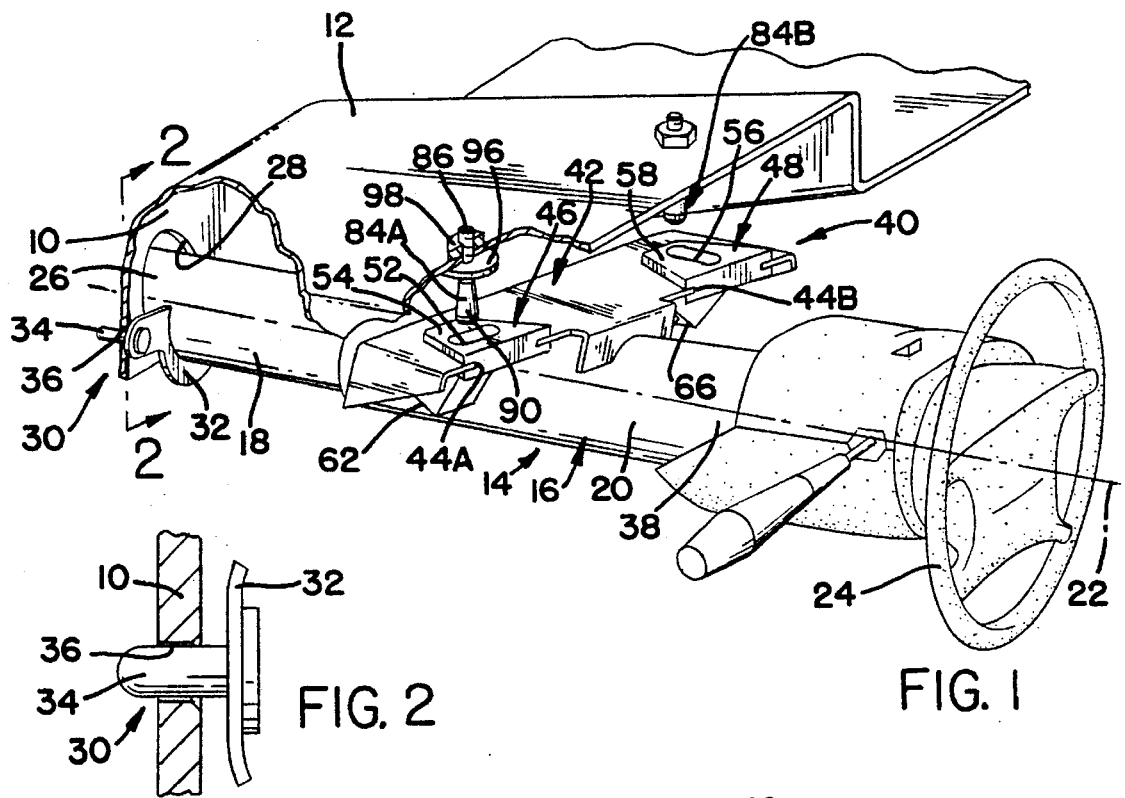
FIG. 1
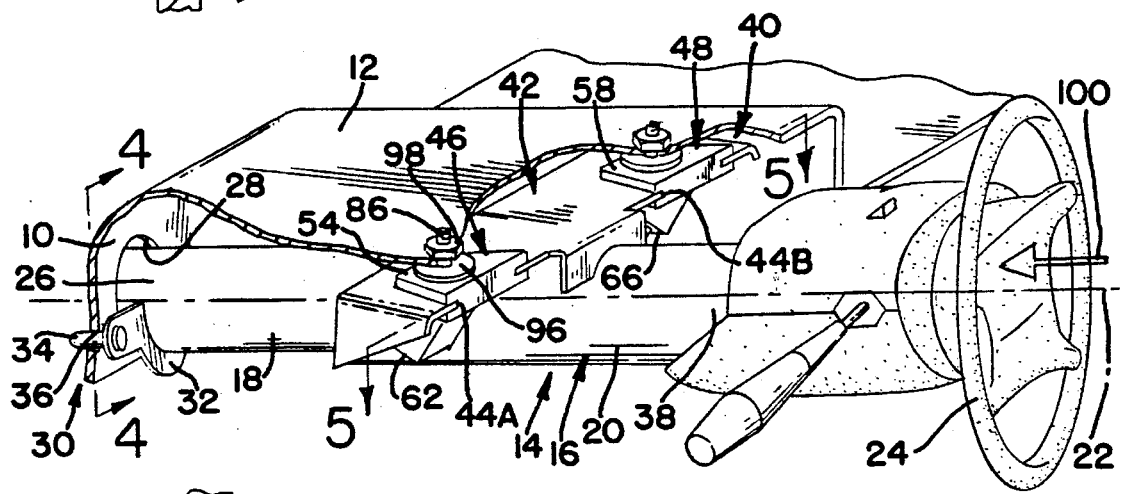
FIG. 2
FIG. 3
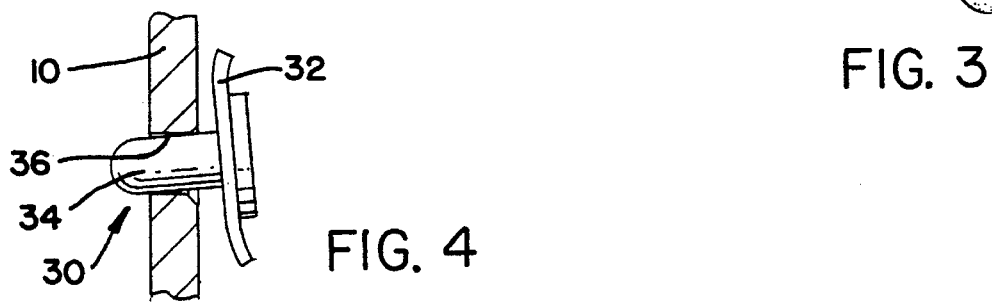
FIG. 4

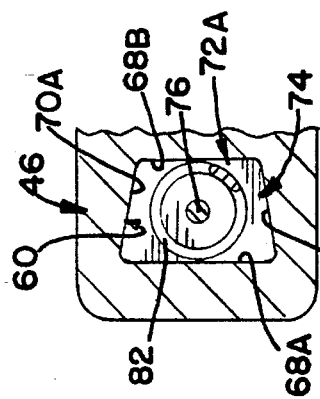
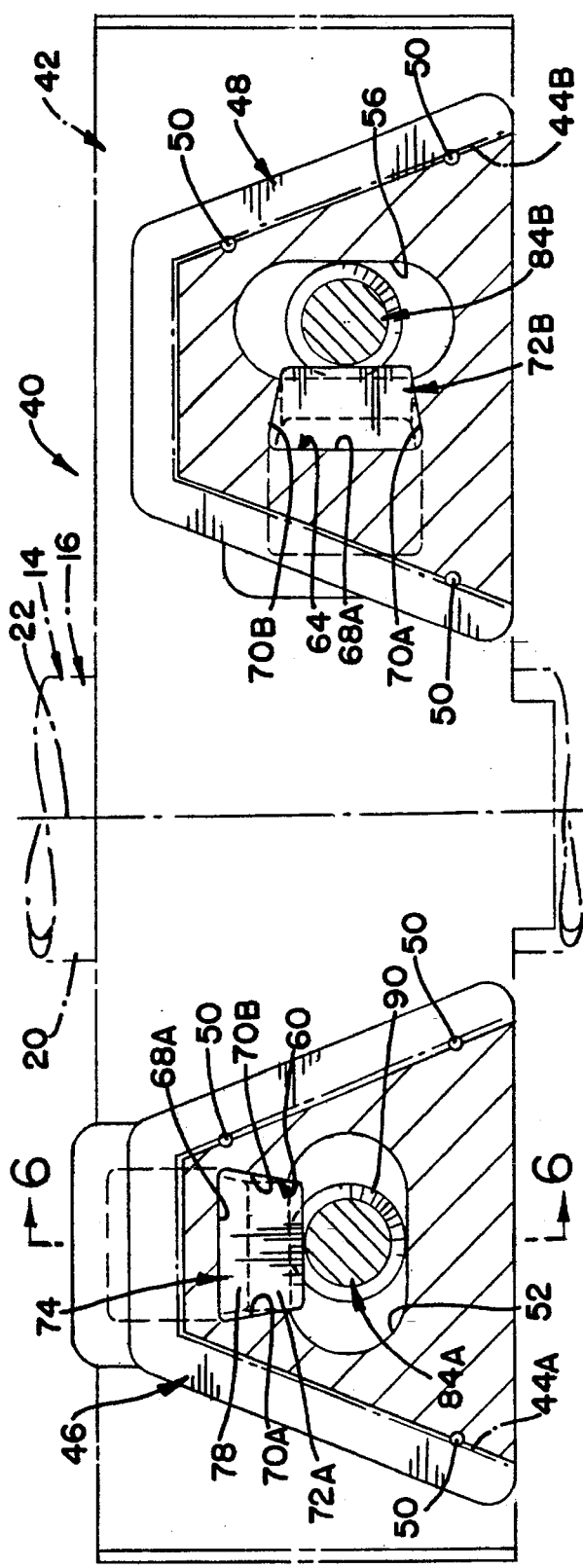
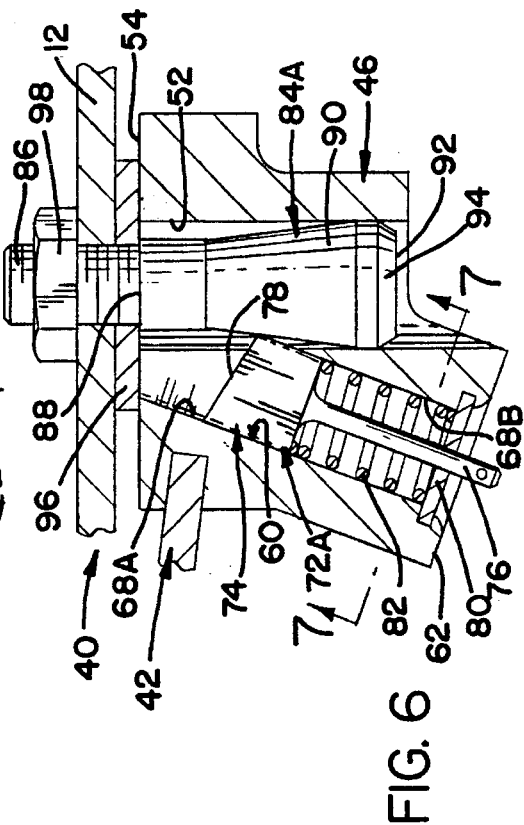

MOTOR VEHICLE STEERING COLUMN

FIELD OF THE INVENTION

This invention relates to motor vehicle steering columns.

BACKGROUND OF THE INVENTION

Typically, a steering column is supported on a body of a motor vehicle at mounts near the upper and lower ends of the steering column. The lower mount commonly allows limited up and down pivotal movement of the steering column to facilitate installation. The upper mount commonly includes stationary hanger bolts and retaining nuts on the hanger bolts which clamp the steering column to structural elements of the vehicle body. Where the steering column is collapsible longitudinally for energy absorption, releasable capsules between the hanger bolts and the steering column separate from the steering column in response to an impact force thereon. In the steering columns described in U.S. Pat. Nos. 3,792,626 and 3,827,710, issued 19 Feb. 1974 and 6 Aug. 1974, respectively, and assigned to the assignee of this invention, the upper mounts include snap-in type latches instead of hanger bolts and retaining nuts.

SUMMARY OF THE INVENTION

This invention is a new and improved motor vehicle steering column including a longitudinally collapsible mast jacket, a lower mount whereat the mast jacket is supported on a front panel of a body of the motor vehicle for vertical pivotal movement, and an upper mount consisting of a pair of rigid strikers on the vehicle body and a pair of releasable capsules on the mast jacket each of which receives in plug-in fashion and automatically retains a corresponding one of the strikers. Each of the capsules includes a socket for a corresponding one of the strikers, a plunger bore intersecting the socket, a plunger in the plunger bore, and a plunger spring biasing the plunger toward an extended position partially obstructing the socket. Each striker has a cam at a distal end thereof and an inverted frustoconical body, i.e. flaring outward toward the distal end. When the mast jacket is pivoted vertically up, the cams on the strikers shift the plungers inward in the plunger bores. When the strikers are seated in the sockets, each plunger spring wedges the corresponding plunger between the frustoconical body of the striker and a side of the plunger bore converging with the frustoconical body of the striker. Each plunger becomes more tightly wedged between the frustoconical body of the striker and the plunger bore in response to attempted forced dislodgment of the striker from the socket. In a preferred embodiment, one of the plungers is oriented laterally and one is oriented longitudinally to eliminate lateral and longitudinal lash between the mast jacket and the vehicle body and the lower mount includes a flex plate which biases the mast jacket vertically downward to eliminate vertical lash between the mast jacket and the vehicle body.

BRIEF DESCRIPTION OF THE DRAWINGS

FIG. 1 is a perspective view of a motor vehicle steering column according to this invention;

FIG. 2 is a sectional view taken generally along the plane indicated by lines 2—2 in FIG. 1;

FIG. 3 is similar to FIG. 1 but showing the steering column according to this invention in a different position;

FIG. 4 is a sectional view taken generally along the plane indicated by lines 4—4 in FIG. 3;

FIG. 5 is a sectional view taken generally along the plane indicated by lines 5—5 in FIG. 3;

FIG. 6 is a sectional view taken generally along the plane indicated by lines 6—6 in FIG. 5; and FIG. 7 is a sectional view taken generally along the plane indicated by lines 7—7 in FIG. 6.

DESCRIPTION OF A PREFERRED EMBODIMENT

Referring to FIGS. 1 and 3, a motor vehicle body, not shown, includes a schematically represented vertical panel 10 at the front of a passenger compartment of the vehicle body and a generally horizontal structural member 12. A steering column 14, according to this invention, includes a mast jacket 16 which may consist of a lower mast jacket 18, an upper mast jacket 20 telescoped over the lower mast jacket, and an energy absorber, not shown, therebetween. A representative steering column having such upper and lower mast jackets and an energy absorber therebetween is described in U.S. Pat. 3,392,599, issued 16 Jul. 1968 and assigned to the assignee of this invention. A steering shaft, not shown, is supported on the mast jacket for rotation about a longitudinal centerline 22 of the latter. A steering wheel 24 is rotatable as a unit with the steering shaft.

As seen best in FIGS. 1–4, a lower end 26 of the mast jacket 16 protrudes through an opening 28 in the vertical panel 10 and is supported thereon by a lower mount 30. The lower mount includes a flex plate 32 rigidly attached to the mast jacket in a plane perpendicular to the centerline 22 of the mast jacket, a pair of mounting studs rigidly attached to the flex plate 32 perpendicular to the plane thereof on opposite sides of the mast jacket, only a single mounting stud 34 being visible in FIGS. 1–4, and a pair of receptacles in the vertical panel which are oversize relative to the mounting studs, only a single receptacle 36 being visible in FIGS. 1–4. The mounting studs 34 are received in the receptacles 36 and cooperate therewith in supporting the lower end 26 of the mast jacket on the vehicle body and in accommodating limited vertical pivotal movement of the mast jacket for installation purposes.

An upper end 38 of the mast jacket 16 is supported on the horizontal structural member 12 by an upper mount 40 including a capsule bracket 42 rigidly attached to the mast jacket near the upper end 38 thereof having a pair of V-shaped, rear-facing slots 44A-B therein. The slot 44A receives a first capsule 46 having a pair of grooves which slidably engage the edges of the slot 44A such that the capsule 46 is pivotable vertically as a unit with the mast jacket and slidable longitudinally out of the open end of the slot 44A. The slot 44B receives a second capsule 48 having a pair of grooves which slidably engage the edges of the slot 44B such that the second capsule 48 is pivotable vertically as a unit with the mast jacket and slidable longitudinally out of the open end of the slot 44B. A plurality of plastic shear pins 50 retain the first and second capsules 46,48 in the slots 44A-B, respectively.

As seen best in FIGS. 1, and 5–7, the first capsule 46 has an elongated lateral socket 52 therein perpendicular to an upper surface 54 of the capsule. The second capsule 48 has an elongated longitudinal socket 56 therein perpendicular to an upper surface 58 of the capsule. A plunger bore 60 in the first capsule 46 opens through a back surface 62 of the capsule and intersects the lateral socket 52 through a long side thereof below the upper surface 54 of the capsule. A plunger bore 64 in the second capsule 48 opens through a back surface 66 of the capsule, FIGS. 1 and 3, and intersects the longitudinal socket 56 through a long side thereof below the upper surface 58. Each of the plunger bores 60,64 has a trapezoidal cross section, FIG. 7, defined by a pair of parallel sides 68A-B and a pair of non-parallel sides 70A-B.

A pair of plungers 72A-B are slidably disposed in the plunger bores 60,64, respectively. Representative of both plungers, the plunger 72A includes a head 74 and an integral shank 76. The plunger head 74 has a beveled end 78 thereon and is shaped to fit the trapezoidal cross section of the plunger bore 60 so that the plunger is slidable back and forth in the plunger bore but is prevented from rotating therein. The plunger shank 76 protrudes from the plunger bore through a clearance hole in a spring seat 80 on the back surface of the capsule. A spring 82 in the plunger bore 60 around the plunger shank 76 seats against the plunger head 74 and against the spring seat 80 and biases the plunger toward a position, not shown, in which the beveled end 78 of the plunger head partially obstruct the socket 52.

The upper mount 40 further includes a pair of strikers 84A-B on opposite sides of the mast jacket 16. Representative of both strikers 84A-B, the striker 84A has a screw threaded end 86, an annular shoulder 88, and an inverted frustoconical body 90, i.e. the frustoconical body flares radially outward toward a maximum diameter near a distal end 92, FIG. 6, of the striker. A chamfer or bevel 94 on the striker 84A at the distal end 92 thereof defines a cam on the striker. The screw threaded end 86 of the striker protrudes through the horizontal structural member 12 from below. A washer 96 seated on the annular shoulder 88 of the striker cooperates with a nut 98 on the screw threaded end of the striker in rigidly clamping the striker to the horizontal structural member.

When the mast jacket 16 is supported on the vertical panel 10 at the lower mount 30 and pivoted vertically upward, the strikers 84A-B penetrate the lateral and longitudinal sockets 52,56 in plug-in fashion. When the cams defined by the chamfers 94 on the strikers engage the beveled end 78 of the head of the corresponding one of the plungers 72A-B, the plungers are cammed into their respective plunger bores so that the strikers can fully seat in the sockets.

The springs 82 continuously thrust the plunger heads toward the frustoconical bodies of the strikers so that when the strikers 84A-B are fully seated in the lateral and longitudinal sockets 52,56, respectively, the plunger heads 74 are automatically wedged between the inverted frustoconical bodies 90 of the strikers and a side of the corresponding one of the plunger bores 60,64, which cooperate in defining wedge-shaped chambers on the capsules. The angle at which the plunger bores 60,64 converge with the lateral and longitudinal sockets 52,56, and the cone angles of the inverted frustoconical bodies 90 of the strikers, are calculated to achieve tighter wedges of the plungers between the strikers and the plunger bores in response to attempted forced dislodgment of the capsules 46,48 from the strikers 84A-B, respectively. If separation of the capsules from the strikers is necessary, a pulling tool, not shown, may be attached to the portion of the shank 76 of each plunger extending beyond the corresponding spring seat and the plungers withdrawn from the lateral and longitudinal sockets against the compression of the springs 82.

When the strikers 84A-B are fully seated in the lateral and longitudinal sockets 52,56, respectively, lateral and longitudinal looseness or "lash" between the mast jacket and the vehicle body is eliminated by the springs 82 which thrust the plunger 72A longitudinally and the plunger 72B laterally, FIG. 5. Additionally, near the upper limit of vertical pivotal movement of the mast jacket, FIGS. 3-4, resilient deformation of the flex plate 32, which occurs after the stud 34 becomes wedged between the upper and lower edges of the receptacles 36, biases the mast jacket downward relative to the horizontal structural member 12 so that vertical looseness or "lash" between the mast jacket and the vehicle body is eliminated.

In operation, the upper and lower mounts 40,30 normally rigidly support the mast jacket on the vehicle body so that the steering column is effective to transfer manual steering effort from the steering wheel 24 to a steering gear, not shown, ahead of the vertical panel 10. An impact force on the steering wheel in the direction of an arrow 100, FIG. 3, is transferred to the mast jacket 16 and initiates energy absorbing collapse thereof in the direction of the longitudinal centerline 22 when the magnitude of the impact force is sufficient to shear the plastic pins 50 securing the capsules 46,48 to the capsule bracket 42. Thereafter, the capsules slide out of the slots 44A-B in the capsule bracket as the mast jacket collapses toward the vertical panel 10.

We claim:

1. A motor vehicle steering column including an energy absorbing mast jacket collapsible in the direction of a longitudinal centerline of said mast jacket in response to an impact force thereon, a lower mount supporting a lower end of said mast jacket on a body of said motor vehicle and accommodating vertical pivotal movement of said mast jacket, and an upper mount normally rigidly supporting an upper end of said mast jacket on said vehicle body separable in response to said impact force on said mast jacket to release said upper end of said mast jacket from said vehicle body for energy absorbing collapse, characterized in that said upper mount comprises:

a capsule bracket on said mast jacket including a first slot having an open side, a first capsule in said first slot pivotable vertically as a unit with said mast jacket and slidable out of said first slot through said open end thereof to release said mast jacket for energy absorbing collapse, a socket in said first capsule open through an upper surface of said first capsule, a first striker on said vehicle body seated in said socket in said first capsule when said mast jacket is pivoted vertically upward, and a snap-in retaining means on said striker and on said capsule automatically operative to prevent forced dislodgment of said socket in said first capsule from said first striker after said first striker is seated in said socket in said first capsule.

2. The motor vehicle steering column recited in claim 1 wherein said snap-in retaining means comprises:

an inverted frustoconical body on said first striker, a plunger bore in said first capsule intersecting said socket below said upper surface of said first capsule such that a side of said plunger bore cooperates with said inverted frustoconical body of said first striker in defining a wedge-shaped chamber on said first capsule, a first plunger slidable in said plunger bore in said first capsule, and a spring biasing said first plunger toward an apex of said wedge-shaped chamber on said first capsule so that said first plunger is wedged between said inverted frustoconical body of said first striker and said side of said plunger bore in said first capsule.

3. Said motor vehicle steering column recited in claim 2 wherein said upper mount further comprises:

a cam on said first striker at a distal end thereof engageable on said first plunger before said striker is seated in said socket in said first capsule operative to cam said first plunger out of said socket so that said first striker can seat in therein.

4. The motor vehicle steering column recited in claim 3 wherein said upper mount further comprises:

a second slot in said capsule bracket having an open side, a second capsule in said second slot pivotable vertically as a unit with said mast jacket and slidable out of said second slot through said open end thereof to release said mast jacket for energy absorbing collapse, a socket in said second capsule open through an upper surface of said second capsule, a second striker on said vehicle body having an inverted frustoconical body seated in said socket in said second capsule when said mast jacket is pivoted vertically upward, a plunger bore in said second capsule intersecting said socket below said upper surface of said second capsule such that a side of said plunger bore cooperates with said inverted frustoconical body of said second striker in defining a wedge-shaped chamber on said second capsule, a second plunger slidable in said plunger bore in said second capsule, and a spring biasing said second plunger toward an apex of said wedge-shaped chamber on said second capsule so that said second plunger is wedged between said inverted frustoconical body of said second striker and a side of said plunger bore in said second capsule, said plunger bore in said first capsule being oriented such that said first plunger exerts a laterally directed force on said first striker to eliminate lateral lash between said vehicle body and said mast jacket and said plunger bore in said second capsule being oriented such that said second plunger exerts a longitudinally directed force on said second striker to eliminate longitudinal lash between said vehicle body and said mast jacket.

5. The motor vehicle steering column recited in claim 4 wherein said lower mount comprises:

a flex plate on said mast jacket resiliently flexed when said mast jacket is pivoted vertically upward biasing said mast jacket vertically downward to eliminate vertical lash between said vehicle body and said mast jacket when said first and said second strikers are seated in said sockets in said first and said second capsules.

* * * * *